July 19, 1932.  F. W. BROOKE  1,868,091
CERAMIC KILN
Filed Jan. 7, 1929  5 Sheets-Sheet 1
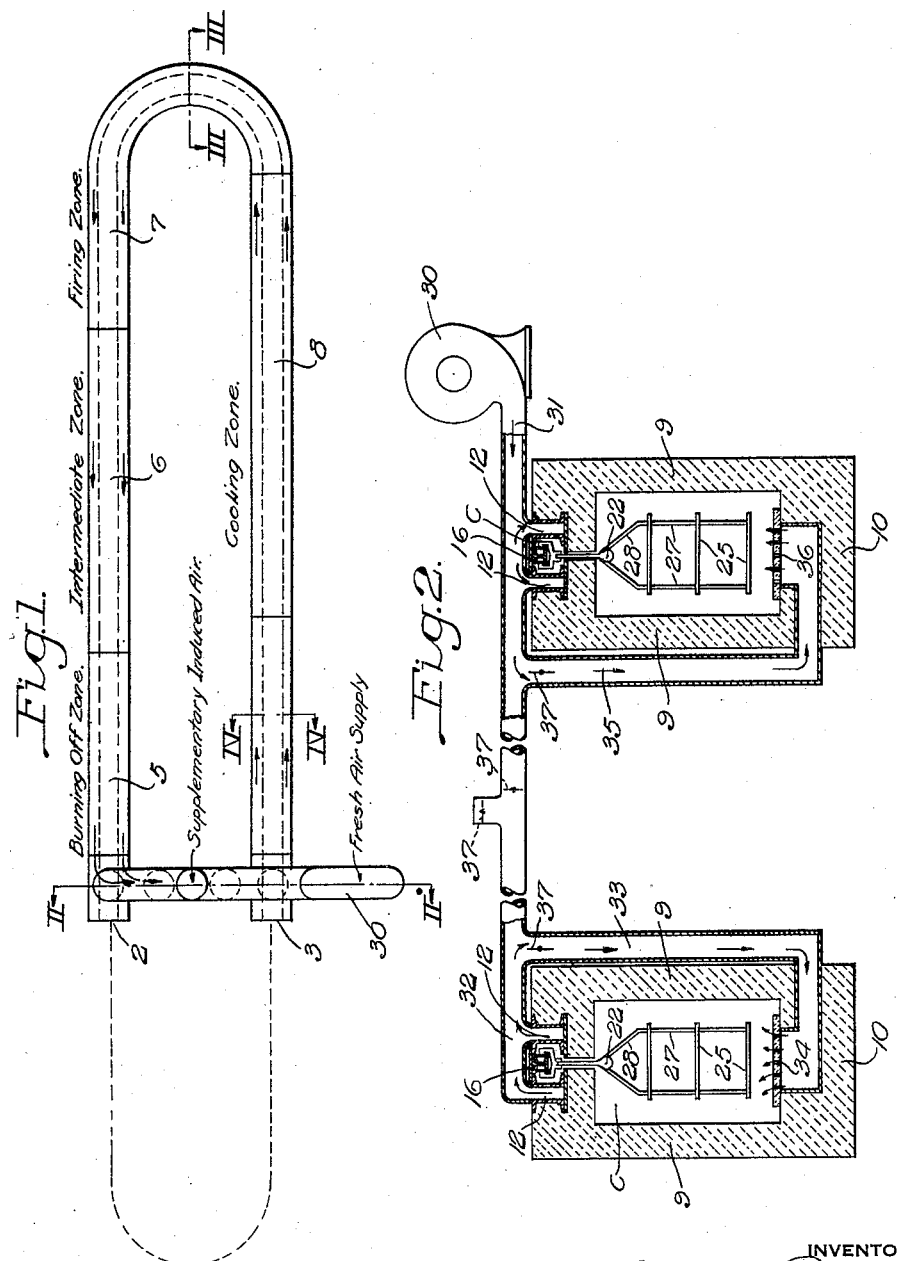
INVENTOR
Frank W. Brooke,

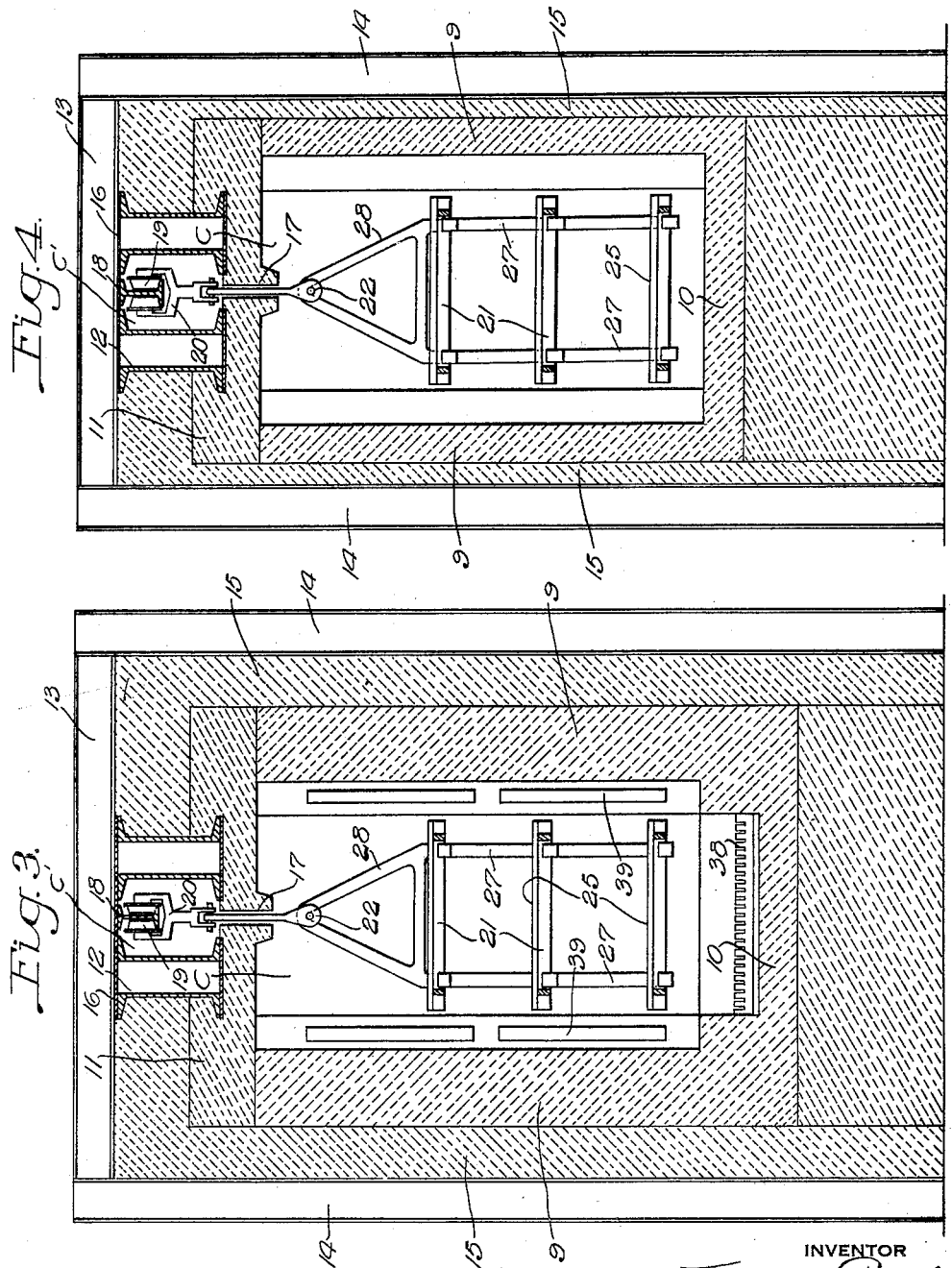

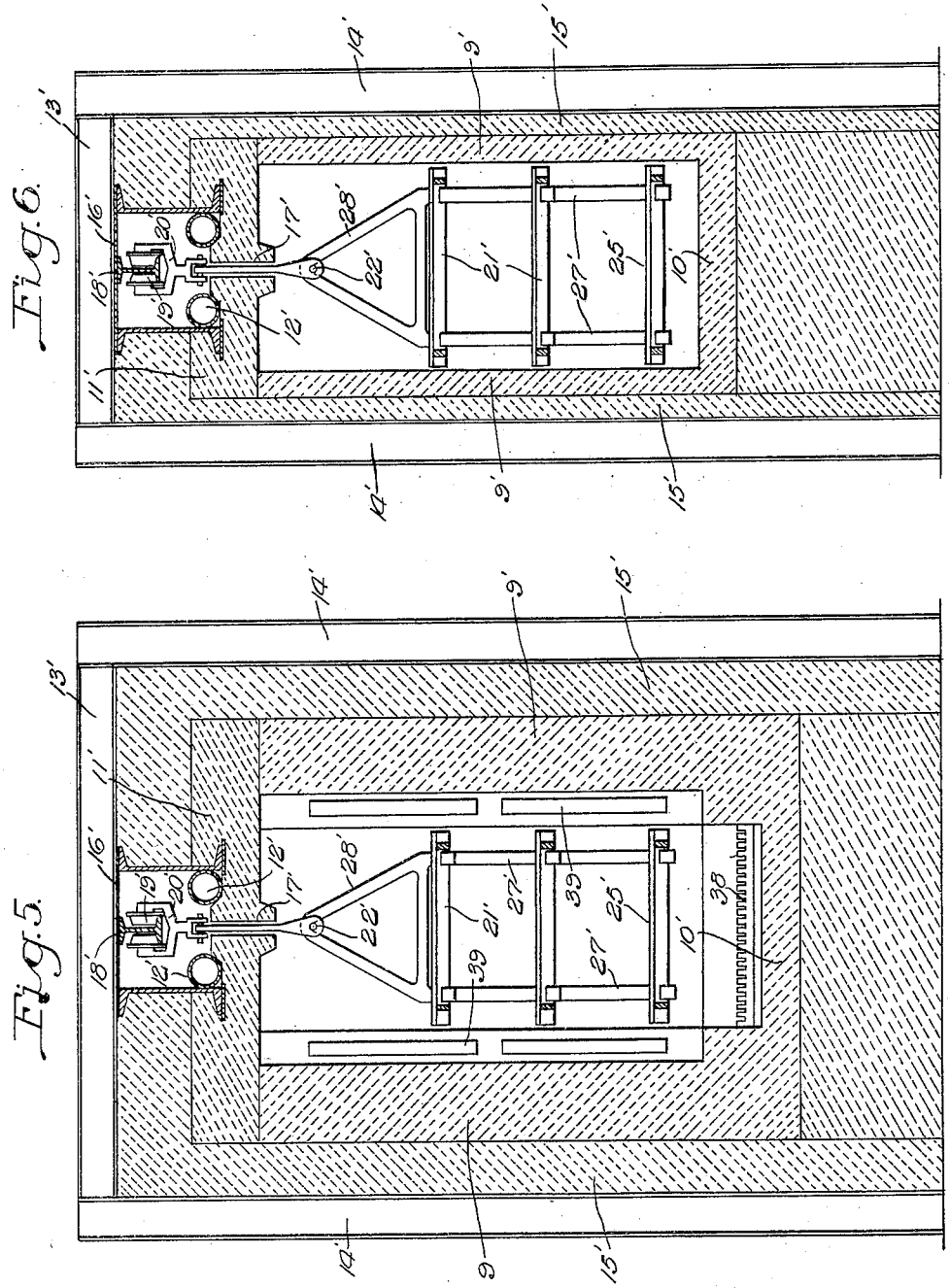

July 19, 1932.  F. W. BROOKE  1,868,091
CERAMIC KILN
Filed Jan. 7, 1929    5 Sheets-Sheet 4

INVENTOR
Frank W. Brooke,

July 19, 1932.  F. W. BROOKE  1,868,091
CERAMIC KILN
Filed Jan. 7, 1929   5 Sheets-Sheet 5
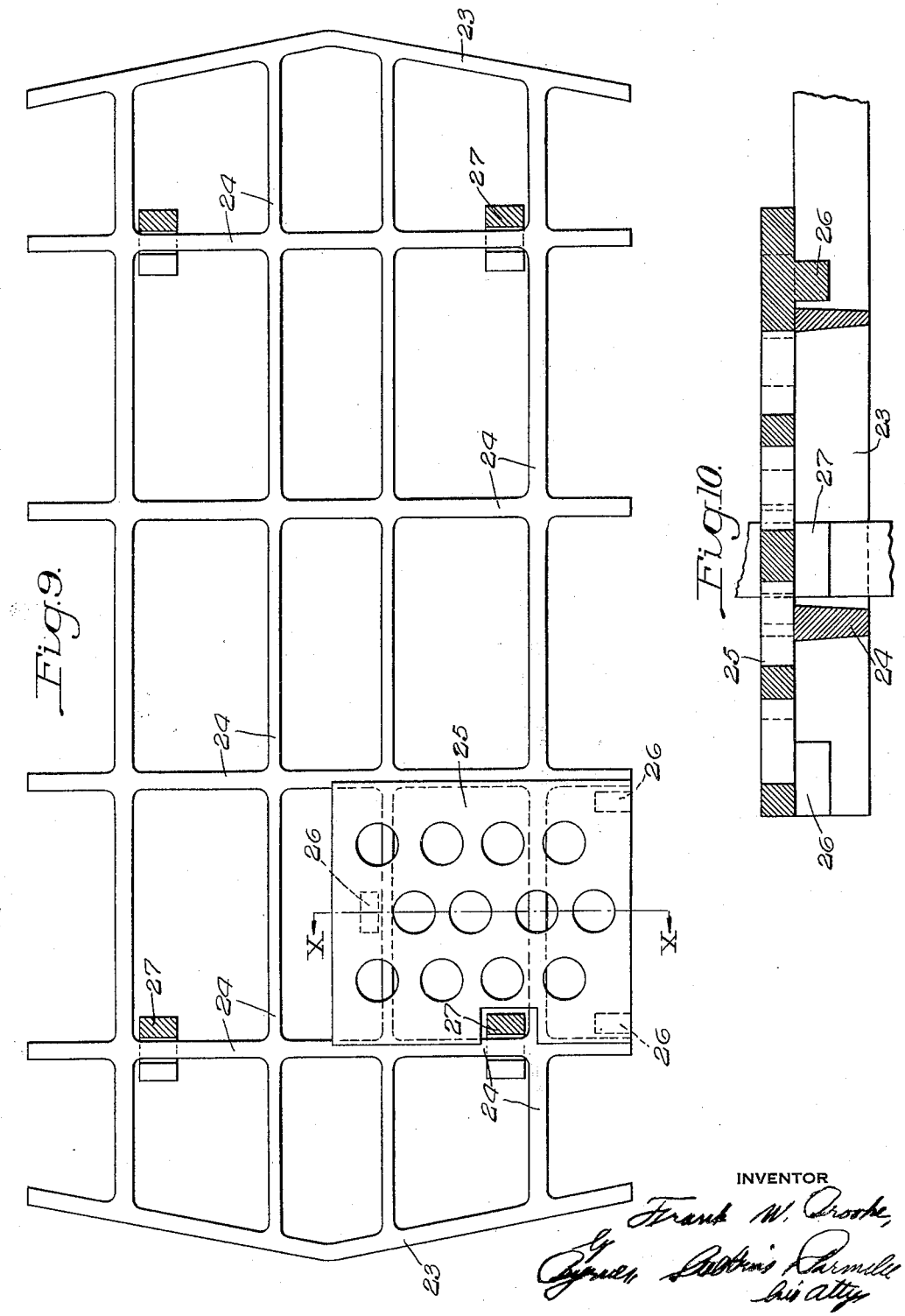
INVENTOR Patented July 19, 1932

1,868,091

UNITED STATES PATENT OFFICE

FRANK W. BROOKE, OF PITTSBURGH, PENNSYLVANIA, ASSIGNOR TO WILLIAM SWINDELL & BROTHERS, OF PITTSBURGH, PENNSYLVANIA, A CORPORATION OF PENNSYLVANIA

CERAMIC KILN

Application filed January 7, 1929. Serial No. 330,722.

The present invention relates broadly to the art of kiln structures, and more particularly to kilns of the character especially adapted for use in the ceramic industry.

It is customary in the art to which this invention particularly pertains in the decorating of chinaware by the continuous process, to utilize tunnel kilns through which a train of cars is continuously moved. Various designs of cars or carriers have been tried, and various methods of heat application have been used in an effort to improve, with a kiln of given capacity, the uniformity with which the maximum quantity of ware may be heated with a minimum expenditure of heat.

Commercial kilns of the type now commonly utilized vary in length from fifty to three hundred feet through which the cars or carriers must be moved continuously, and subjected to as nearly as possible uniform heat conditions.

Such kilns have been open to a number of objections inherent, to a large extent at least, in the use of cars which necessarily provide a considerable mass or frame structure carried by the wheels. If ware is directly supported on the frame structure of the cars, it is quite apparent that the relatively smaller masses presented by the individual ceramic articles will be much more quickly brought to a given temperature than will the frame structure of the car. Not only this, but the necessity of maintaining proper lubrication for the car wheels, as well as the desideratum of not unduly wasting heat has dictated the advisability of not employing heating means below the plane of the car. This has produced in practice a relatively lower temperature at the bottom portion of the kiln which, while desirable from the standpoint of efficient lubrication of the car wheels, is decidedly objectionable from the standpoint of uniformity of heat. This condition has in turn necessitated the raising of the ware a considerable distance above the frame structure of the car in order to attempt to remove it as far as possible from the cooling influence thereof. Such an operation, however, has had the objectionable result of materially decreasing the ware handling capacity of a given installation.

In addition to the difficulties encountered from the standpoint of effective ware positioning and ware heating in continuous kilns of the character referred to, there has existed the additional disadvantage represented by heat loss by the cars traveling out of the kiln into position for unloading and subsequent loading.

The present invention has for one of its objects the provision of an improved kiln structure including carriers supported by suspending the same from the upper portion of the furnace, and comprising a relatively small mass as compared with the cars heretofore used, whereby not only is it possible to directly support ware from all portions thereof, but also possible to supply heat from the bottom as well as from both sides of the carrier. Such a carrier construction is also advantageous from the standpoint of economy in operation due to the relatively smaller heat losses represented by its use and the greater rapidity with which it can be brought to a desired temperature condition. From the standpoint of practical operation, a carrier of the suspended type having the characteristics referred to is further desirable in that by reason of its lighter mass it occupies a considerably smaller proportion of the available area of a kiln, thereby greatly increasing the ware handling capacity of a kiln of given dimensions.

In the accompanying drawings I have shown by way of illustration only, certain preferred embodiments of my invention.

In the drawings:—

Figure 1 is a diagrammatic top plan view representing one form of a kiln constructed in accordance with the present invention.

Figure 2 is a transverse sectional view on the line II—II of Figure 1.

Figure 3 is a transverse sectional view, on an enlarged scale, of a portion of the firing zone of the kiln, such, for example, as that indicated by the lines III—III of Figure 1.

Figure 4 is a view similar to Figure 3 through any desired portion of the cooling zone, as indicated, for example, by the line IV—IV of Figure 1.

Figures 5 and 6 respectively are partial sectional views similar to Figures 3 and 4, but illustrating slightly modified embodiments of the invention.

Figure 7:
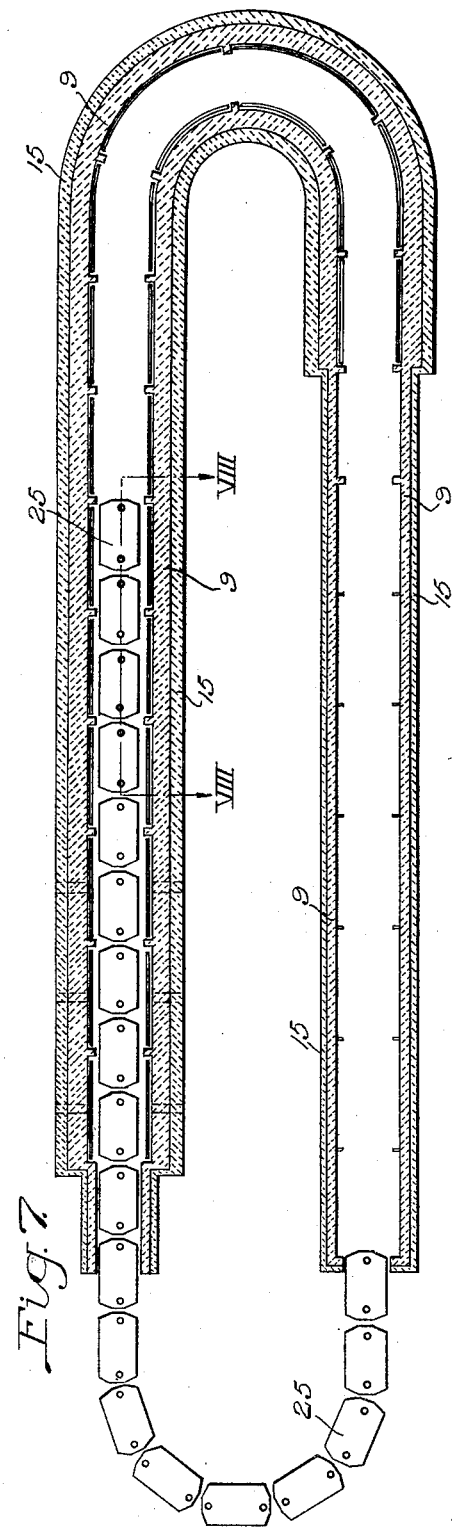

Figure 7 is a horizontal sectional view through the kiln of Figure 1.

Figure 8:
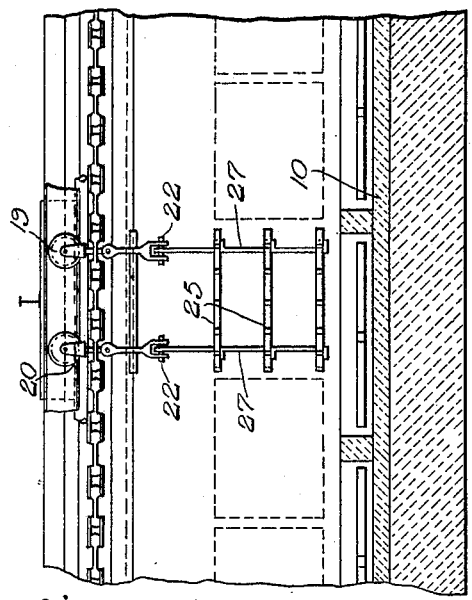

Figure 8 is a partial vertical sectional view along the line VIII—VIII of Figure 7.

Figure 9 is a top plan view of one of the individual carriers illustrated in Figure 8; and Figure 10 is a detail sectional view along the line X—X of Figure 9, looking in the direction of the arrows.

While a kiln constructed in accordance with the present invention is adapted either to kilns of the straight line type or to kilns of the U-type, I have herein illustrated it as applied only to a kiln of the latter type. Such a kiln is indicated in Figure 1, as having an inlet end 2, and an outlet end 3, connected by a continuously extending portion 4 preferably of such construction as to provide a burning off zone 5, an intermediate zone 6, a firing zone 7, and a cooling zone 8.

The kiln may conveniently comprise suitable refractory side and bottom walls 9 and 10 respectively, providing a carrier chamber C, as clearly indicated for example in Figure 3 of the drawings. This chamber may be partially closed at the top by roof blocks 11 supported at their outer edges on the side walls 9, and at their inner edges on channel beams 12. These channel beams may in turn be carried by a tie member 13, extending between the buckstays or buttresses 14 and tying the same together about the kiln which, also, in accordance with the art, preferably includes a suitable layer of insulation 15.

The channels 12 have secured to their upper portions, a plate 16, by means of which the channels with their associated parts provide a second chamber C' in connection with the chamber C through the relatively narrow opening 17, but cut off from direct communication with the atmosphere.

Extending downwardly between the channels 12 is a rail 18, herein illustrated as comprising a beam, the upper sides of one of the base flanges of which are adapted to cooperate with carrier wheels 19 journalled in stirrups 20, constituting a mono-rail system from which ware carriers 21 are suspended through the medium of suitable connections 22.

The carriers may conveniently be of the construction illustrated in detail in Figures 9 and 10 comprising a frame 23, preferably of a suitable heat resisting metallic alloy of relatively light mass, to which frame are secured transversely extending supporting rods 24, of similar material. The frame and rods are of such construction as to cooperate with bats or plates 25. These plates are preferably of a suitable refractory or other non-metallic material perforated to provide as small a mass as possible. Such a construction provides a non-oxidizable carrier, which at high temperatures presents sufficient strength for the purposes contemplated, and which has a comparatively slight mass as to permit it to be quickly raised to the desired temperature. It further provides a structure which will not sag in use.

At suitable points the bats 25 may be provided with bosses 26 adapted to cooperate with the frame 23 to hold the parts against relative movement. Suspension rods 27 cooperate with the frames in such manner that the bats or plates 25 project there-beyond to provide ware supporting portions both inside and outside of the suspending rods. These rods may in turn be interconnected at their upper portions by means of a suitable tie and suspension link 28 for cooperation with the connections 22 and the mono-rail system before described.

By reason of this construction, it will be apparent that each of the carriers is reversible side for side, or end for end, permitting the carriers after a given period of operation with one side up to be bodily reversed, and used in this reversed condition for any length of time. In this manner, any tendency which any of the carriers might develop toward sagging is efficiently compensated, and the metallic parts of the carrier can be maintained in such condition as to at all times effectively cooperate with and support the bats or plates 25 which, as before set forth, have no sagging tendency.

In accordance with the present invention, I preferably utilize the channels 12 as conduits through which a supply of a suitable cooling fluid, such as air, may be continuously passed to thereby maintain the temperature conditions within the chamber C' relatively lower than the temperature conditions within the carrier chamber C, so as to increase the length of life of the mono-rail system and permit at all times the proper lubrication of the parts thereof. Such a circulation may be obtained, for example, in the manner indicated in Figure 2 of the drawings, by providing a blower 30, the outlet 31 of which is suitably connected to the channels 12 for delivering a supply of air thereto. This air in passing through the channels is preheated so that by the time it reaches the discharge end of the kiln, it has absorbed sufficient heat to possess certain useful characteristics which are made use of in accordance with the present invention. This is accomplished by causing the channels to discharge into a header 32 leading to a duct 33, communicating with the bottom of the kiln through a suitable port opening or series of port openings 34.

Such opening or openings are preferably located in the floor of the kiln adjacent the inlet end of the burning off zone whereby the heated air discharged upwardly into the kiln from the channels 12 tends to prevent the passage outwardly from the kiln of the heated atmosphere therein. In other words, the heated air discharged in this manner constitutes a heat screen of intangible characteristics retaining the desired heat conditions within the kiln while permitting the continuous uninterrupted passage thereinto of the freshly loaded carriers.

The outlet 31 of the blower or compressor 30 may in turn be connected to a duct 35 leading to a port or series of ports 36 at the discharge end of the kiln and similar in construction to the opening or openings 34, whereby at the discharge end of the kiln a blast of cold air may be discharged upwardly into the kiln adjacent the discharge opening. Suitable dampers or regulating valves 37 may be provided at desired points in the air system, as indicated diagrammatically in Figure 2, whereby the relative pressure conditions in different parts of the system may be regulated at will. In actual operation the regulator will preferably be such as to produce a pressure in the inlet and in the outlet, respectively, of such order as to be approximately equal to the pressure condition existing within the kiln adjacent such points, whereby balanced pressure conditions will be maintained. In actual operation of a kiln of the character herein disclosed, this pressure will be substantially equal to atmospheric pressure at all points.

In Figures 5 and 6 there is illustrated a slightly modified embodiment of the invention, in which parts corresponding to the parts already described are designated by the same reference characters having a prime (') affixed thereto. In these figures, the channels 12 are replaced by pipes 12' operating in a manner similar to that already described.

Under normal operating conditions there will be maintained a relatively higher temperature within the burning off zone sufficient for volatilizing certain of the constituents of the decoration, which decoration as well-known, may include varnish, coloring matter, coating material, and the like. After passage through the burning off zone, the ware travels through an intermediate zone into a firing zone which may be of the construction illustrated in Figures 3 and 5 of the drawings. Within this zone there may be provided suitable means for applying heat to the ware on the carriers, such means being herein illustrated as including a bottom electrical heating unit or series of electrical heating units 38 and similar side heating units 39, by means of which heat may be uniformly supplied to the carriers from below as well as at the sides thereof, so that the entire charge may be uniformly heated. After leaving the firing zone, the carriers transport the ware into the cooling zone 8, from which it is discharged, as indicated in the drawings, to a point where it may be unloaded from the carriers and a fresh charge of ware placed thereon.

From the foregoing description it will be apparent that I provide a carrier chamber and mono-rail chamber interconnected, whereby the two may be maintained at substantially the same pressure at all times, but of such construction that different temperature conditions may be maintained in the chambers, the temperature conditions in the mono-rail chamber being at all times such as to be conducive to proper lubrication and long life, while the temperature conditions within the carrier chamber may vary depending upon the zone through which the carriers are passing. The construction of the mono-rail chamber makes it unnecessary to make any special provision for the escape of any atmosphere either from the carrier chamber thereinto, or from the mono-rail chamber into the carrier chamber. The construction also makes it possible to permanently seal the entire intermediate portion of the kiln structure against the possible ingress of atmosphere thereto. This lends to economy in the operation of the installation.

Further advantages of the invention arise from the provision of a ceramic kiln utilizing a suspended carrier which permits the application of heat from below the carrier as well as from the sides thereof, whereby its entire charge of ware may be uniformly heated.

Still other advantages arise from the provision of a carrier of relatively light mass, preferably including metallic and non-metallic portions, and preferably of such nature that the metallic portions can be reversed at will to compensate for any tendency toward sagging, with the entire structure of such relatively light mass and heat absorbing capacity as to permit it to be quickly brought to the desired temperature conditions while preventing any great loss of heat by reason of the passage of the carrier from the kiln.

This construction not only insures greater uniformity in the treatment of the ware with correspondingly better results, but makes the use of electrical heating means for ceramic kilns entirely practicable.

Still further advantages arise from the provisions of means for maintaining intangible heat screens at the charging and discharging ends of the kiln whereby such ends may be left constantly open for the passage into or out of the kiln of the carriers without any appreciable loss of heat from the kiln or disturbance of the desired operating conditions therein.

While I have herein illustrated certain preferred features of the present invention and have described the same as being particularly useful in connection with electrically heated decorating kilns, it will be apparent that the utility of the invention is not limited in some respects to the particular use to which it is put, and that many changes in the construction and arrangement of the parts and in the operation of the kiln may be made without departing either from the spirit of the invention or the scope of my broader claims.

I claim:—

1. In a ceramic kiln, a plurality of ceramic carriers, and means for suspending said carriers from points so located as to provide ware supporting portions inside and outside of the area defined by said suspending means.

2. In a ceramic kiln, a plurality of ceramic carriers including metallic and non-metallic portions, and means for suspending the metallic portions to permit reversal thereof.

3. In a ceramic kiln, a plurality of ceramic carriers comprising metallic and non-metallic portions, means for suspending said carriers, and individual heating means for said carriers below the same and at the sides thereof.

4. In a ceramic kiln, a plurality of ceramic carriers comprising metallic and non-metallic portions, means for suspending said carriers, and electrical heating units for said carriers below the same and at the sides thereof.

5. In a ceramic kiln, a plurality of ceramic carriers each comprising a series of refractory supporting plates of relatively light mass, means for suspending said carriers, and heating means for said carriers below the same and at the sides thereof.

6. In a kiln, a carrier chamber, a mono-rail chamber in constant communication therewith, carriers in said first mentioned chamber, means in said second mentioned chamber for supporting said carriers, and fluid conducting means within said second chamber for receiving and enclosing a medium for indirectly cooling said second mentioned chamber.

7. A kiln, having constantly open charging and discharging openings, carriers adapted to pass into and from said kiln through said openings, and means for maintaining an intangible heat screen adjacent both of said openings and effective thereacross, and through which said carriers must pass.

8. A kiln, having constantly open charging and discharging openings, carriers adapted to pass into and from said kiln through said openings, and means for maintaining an intangible heat screen adjacent both of said openings and effective there-across, and through which said carriers must pass, said heat screens having different temperature characteristics adjacent the respective openings.

9. A kiln, having constantly open charging and discharging openings, and means for maintaining a heat screen adjacent each of said openings and effective across the area of said openings.

10. A kiln, having constantly open charging and discharging openings, and means for maintaining a heat screen adjacent each of said openings and effective across the area of said openings, the heat screen adjacent the charging opening being at a relatively higher temperature than the heat screen adjacent the discharging opening.

11. In a kiln, a carrier chamber, a mono-rail chamber, said kiln having constantly open charging and discharging openings, means for cooling said mono-rail chamber, and means for utilizing the cooling means for the mono-rail chamber for providing a gaseous heat screen for each of said openings.

12. A carrier for ceramic ware, comprising a metallic supporting frame, and means for detachably supporting said frame to permit reversal thereof.

13. A carrier for ceramic ware, comprising a metallic supporting frame, and means for detachably supporting said frame to permit reversal thereof, said frame having non-metallic portions carried thereby for engagement with the ware.

14. In a ceramic kiln, a plurality of ceramic carriers comprising metallic and non-metallic portions, means for suspending said carriers, and individual heating means for said carriers below the same and at the sides thereof, the individual heating means below the carriers being effective throughout substantially the entire width of the kiln.

15. In a ceramic kiln, a plurality of ceramic carriers comprising metallic and non-metallic portions, means for suspending said carriers, and electrical heating units for said carriers below the same and at the sides thereof, the heating units below the carriers being effective throughout substantially the entire width of the carriers.

16. A carrier for ceramic ware, comprising a metallic supporting frame, and means for detachably supporting said frame to permit reversal thereof, said frame having non-metallic portions detachably carried thereby for engagement with the ware.

17. A carrier for ceramic ware, comprising a metallic supporting frame, and means for detachably supporting said frame to permit reversal thereof, said frame having a plurality of individual non-metallic portions detachably carried thereby for engagement with the ware.

In testimony whereof I have hereunto set my hand.

FRANK W. BROOKE.